United States Patent
Coha et al.

(12) 
(10) Patent No.: US 6,804,691 B2
(45) Date of Patent: Oct. 12, 2004

(54) METHOD FOR OPTIMIZATION OF MEMORY USAGE FOR A COMPUTER PROGRAM

(75) Inventors: Joseph A. Coha, San Jose, CA (US); Ashish Karkare, San Jose, CA (US); Timothy C. O'Konski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/104,751

(22) Filed: Mar. 21, 2002

(65) Prior Publication Data

US 2003/0182597 A1 Sep. 25, 2003

(51) Int. Cl.[7] .............................................. H06F 17/30
(52) U.S. Cl. ......................................... 707/206; 707/2
(58) Field of Search ........................... 707/2, 100, 206; 345/666, 764; 703/22; 709/238; 713/194; 718/1; 717/4, 116, 128, 127, 155

(56) References Cited

U.S. PATENT DOCUMENTS

| 5,745,703 | A | * | 4/1998 | Cejtin et al. | ................. | 709/238 |
| 5,819,275 | A | * | 10/1998 | Badger et al. | ............... | 707/100 |
| 6,351,845 | B1 | * | 2/2002 | Hinker et al. | ............... | 717/128 |
| 6,523,168 | B1 | * | 2/2003 | Arnold et al. | ............... | 717/116 |

FOREIGN PATENT DOCUMENTS

EP        1349077 A2  *  10/2003  ........... G06F/12/02

* cited by examiner

*Primary Examiner*—Diane D. Mizrahi
*Assistant Examiner*—Apu Mofiz

(57) ABSTRACT

A method for optimization of memory usage for a computer program. Memory usage data is received wherein the memory usage data comprises timing information. A graphical representation of the memory usage data is generated. At least one heap parameter is received. A memory usage simulation is performed based on the memory usage data and the heap parameter.

23 Claims, 8 Drawing Sheets

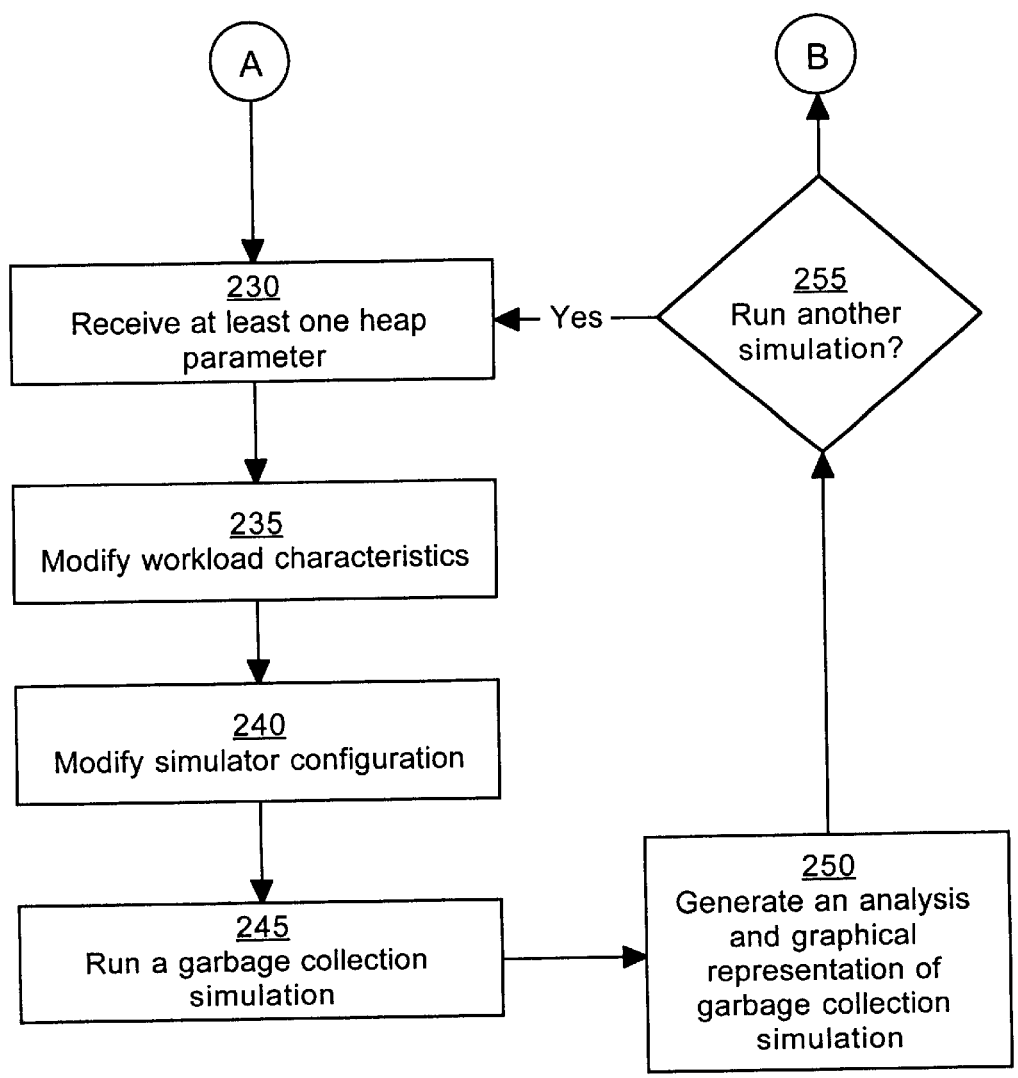

METHOD FOR OPTIMIZATION OF MEMORY USAGE FOR A COMPUTER PROGRAM

FIELD OF INVENTION

Various embodiments of the present invention relate to the field of computer programming.

BACKGROUND OF THE INVENTION

Many modern programming languages provide facilities for dynamic allocation of memory for objects or other data structure instances created by applications at run-time. Some languages such as C and C++ require explicit user action for reclaiming such dynamically allocated memory, while other languages such as Java and C# provide support for memory management that enables automatic reclamation of dynamically allocated memory. For example, the Java programming language allocates objects within the Java Virtual Machine (JVM) heap. When an object is no longer required, it is not explicitly released or removed from the heap. In order to remove unused objects, Java provides a built in capability for the collection of unreferenced dynamically allocated objects, herein referred to as "garbage." The automatic memory management capability is commonly referred to as "garbage collection".

Garbage collection provides the ability to release and reclaim memory when it is no longer required, thus providing a paradigm that enables the creation of more efficient applications. However, garbage collection itself adds a performance overhead to many Java applications. In particular, Java enterprise applications that utilize significant system memory resources can be performance or capacity impaired based on the garbage collection activity that they produce as the workload they are processing increases. This leads to slow and sometimes unreliable operation of Java enterprise applications.

Except for the situations where garbage collection overhead is a direct result of software defects, non-optimal heap memory usage and incorrect policy choices for the garbage collector are the primary causes of increased garbage collection overhead. The process of configuring the heap for optimal memory usage and fine-tuning the garbage collector policies is referred to as "garbage collector tuning."

Garbage collector tuning can yield a very large performance payoff (e.g., 100 percent, or even substantially higher) on certain enterprise applications by optimizing the heap memory usage and reducing the total time spent in garbage collection. This enables one to achieve predictable and optimal performance of applications, written in Java or similar programming languages.

Current garbage collection tools are integrated as part of Java profiling or monitoring solutions. These tools typically rely on measuring heap capacity using either published Java interfaces, or rely on the garbage collection trace option available in an implementation of the JVM. While these tools provide a user with some guidance for optimizing garbage collection, these tools have a number of drawbacks. Most significantly, these tools do not provide any guidance on the actual optimal garbage collection parameters, and provide no relief from the expensive process described below.

FIG. 1 is a flowchart diagram illustrating a process 100 for garbage collection tuning in accordance with the prior art. At step 105, the memory allocation behavior trace used to configure the garbage collection is specified to the interpreter. At step 110, an application is executed for the programming language which the application was written in. At step 115, the trace data is analyzed. At step 120, it is determined whether or not the desired results were achieved. If so, process 100 ends. Alternatively, if desired results were not achieved, as shown at step 125, the heap parameters are adjusted based on the analysis and process 100 returns to step 105.

Typically, garbage collection is subject to user-entered or default parameters. In order to determine which parameters to insert, a user must run the application and analyze the results of the Java heap behavior. For example, a user must perform a run of the application to allow for collection of heap behavior data, and analyze the results. While the overall garbage collection time may be small, garbage collections may take a substantial amount of the overall execution time for large applications, such as enterprise applications. For example, the garbage collection on a large application dominate the overall execution time. Upon completing a run of the application, the heap behavior data is analyzed and the new parameters are specified by the user based on this analysis. This process is repeated until the desirable parameters are entered.

Furthermore, in order to optimize garbage collection, a user must determine new parameters whenever the application is changed or whenever the platform is changed. The time spent running the application, collecting the heap behavior data, and analyzing the results can be sizable, resulting in substantial costs to those running the applications.

Additional problems arise when the application being analyzed is being diagnosed off-site. It is typically too cumbersome to install an application, particularly on a third party computer system. Furthermore, the owner of the application may not want to install the application on a third party computer system due to privacy concerns. As such, a third party must tell the user which parameters to enter, then wait until the application is run, and the heap behavior data is collected. This consumes the computing resources of the application owner, and may impose extra costs beyond those associated directly with running the application (e.g., network downtime and lowered performance of other applications).

SUMMARY OF THE INVENTION

A method for optimization of memory usage for a computer program is presented. Memory usage data is received wherein the memory usage data comprises timing information. A graphical representation of the memory usage data is generated. At least one heap parameter is received. A memory usage simulation is performed based on the memory usage data and the heap parameter.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A and 2B are a flowchart diagram illustrating a process for selecting a parameter for garbage collection tuning in accordance with an embodiment of the present invention.

BEST MODE(S) FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
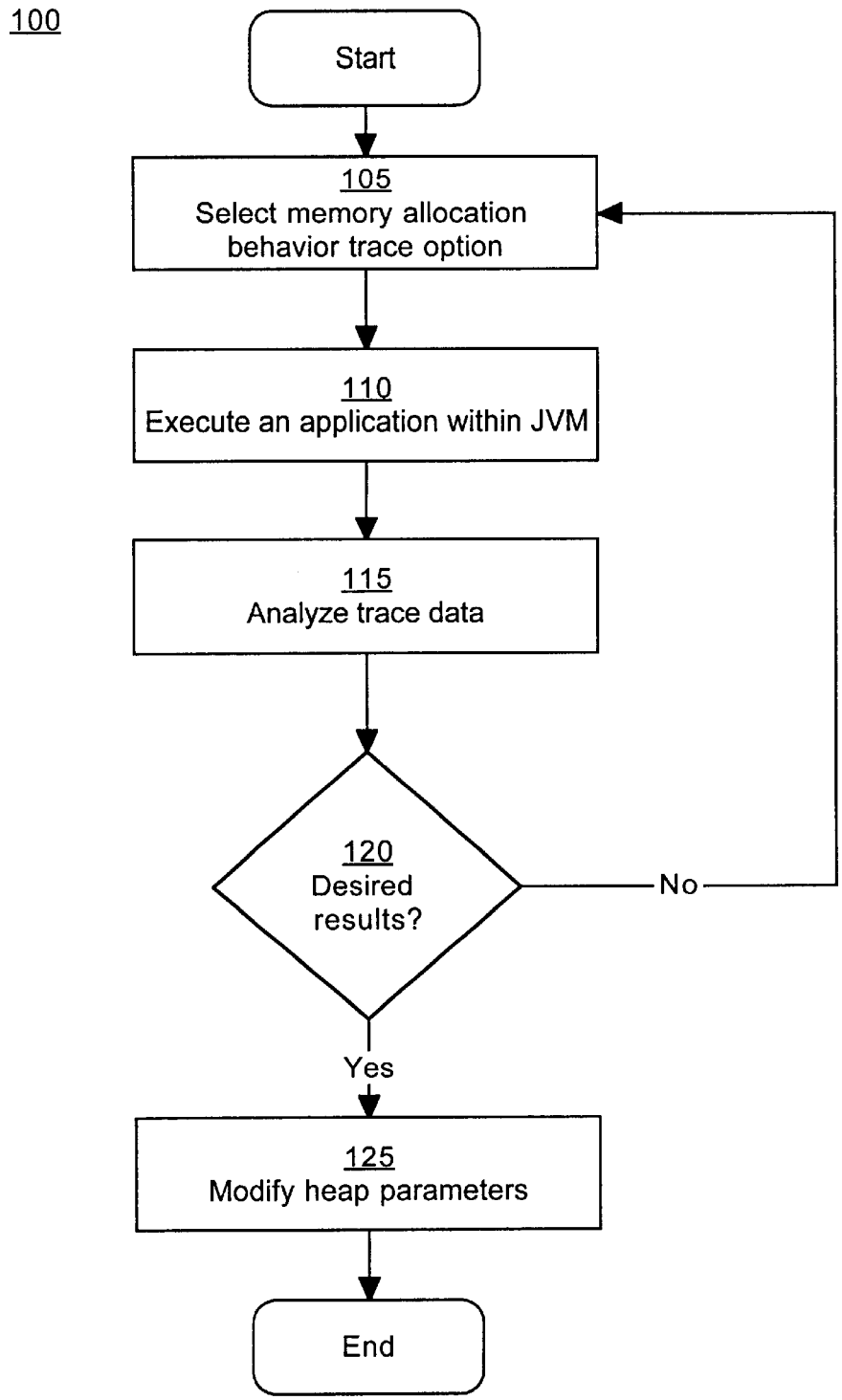
FIG. 1 is a flowchart diagram illustrating a process for garbage collection tuning in accordance with the prior art.
Figure 2A:
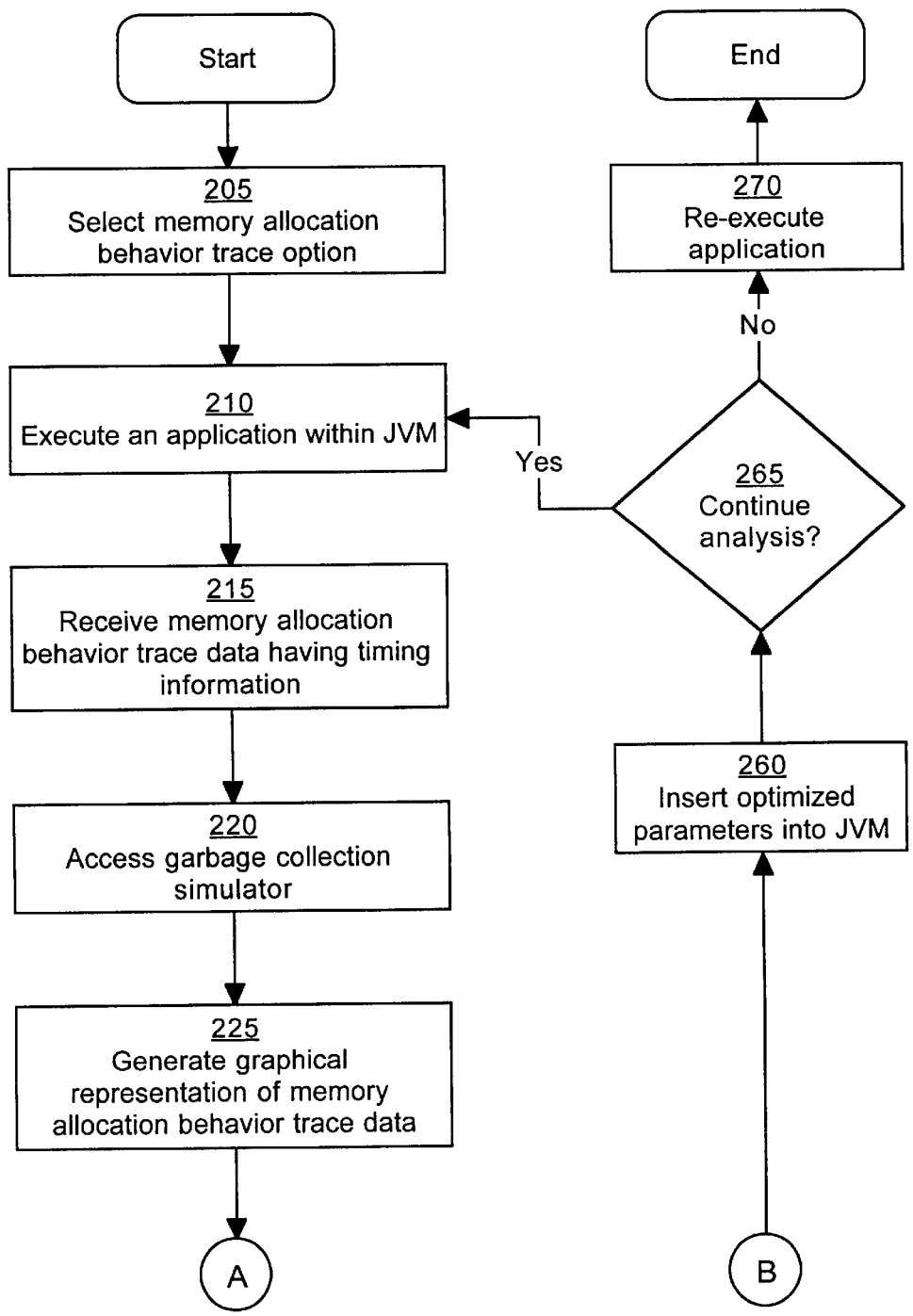

FIGS. 2A and 2B are a flowchart diagram illustrating a process 200 for simulating programming language memory usage in accordance with an embodiment of the present invention. In one embodiment, process 200 is carried out by processors and electrical components under the control of computer readable and computer executable instructions. The computer readable and computer executable instructions reside, for example, in data storage features such as a computer usable volatile memory and/or computer usable non-volatile memory. However, the computer readable and computer executable instructions may reside in any type of computer readable medium. Although specific steps are disclosed in process 200, such steps are exemplary. That is, the embodiments of the present invention are well suited to performing various other steps or variations of the steps recited in FIGS. 2A and 2B.

At step 205 of FIG. 2A, the memory allocation behavior trace used to configure the garbage collection is specified to the interpreter. In one embodiment, the interpreter is a Java Virtual Machine (JVM). The memory allocation behavior trace is a mechanism that captures information that is necessary and sufficient for conducting an offline simulation and that can be collected with minimal intrusion on the executing application. In one embodiment, the memory allocation behavior trace is the -Xverbosegc option on HP-UX. In one embodiment, the memory allocation behavior trace data comprises information regarding the collection of garbage, and is also referred to herein as memory usage data. For clarification, memory usage data is also referred to herein as garbage collection data, memory allocation behavior trace, and detailed garbage collection trace data. Generally, the memory usage data is a file in tabular form comprising detailed information regarding events and operations occurring during a garbage collection. In one embodiment, the memory usage data includes, but is not limited to:

why the garbage collection was performed;

how long the garbage collection took;

the time the garbage collection occurred;

how much memory was collected by this specific garbage collection (e.g., how efficient this particular garbage collection was);

detailed information about heap capacity;

what portion of each of the individual segments was used before the garbage collection;

what portion of each of the individual segments was used after the garbage collection; and what is the approximate age of objects deemed to be "old".

In one embodiment, where the application is Java-based, the memory usage data is produced by selecting the -Xverbosegc option in the JVM garbage collector.

At step 210, an application is executed for the programming language which the application was written in. In one embodiment, the application is an enterprise application. In one embodiment, the application is a Java-based application, written in a Java-based programming language. In the present embodiment, the interpreter is a JVM. For purposes of the present application, the interpreter is referred to as a JVM for Java-based programming languages, however, it should be appreciated that the present invention is intended for use with any programming language that utilizes collection of unreferenced dynamically allocated objects (e.g., garbage) to free unused memory.

At step 215, the garbage collection data (e.g., memory allocation behavior trace data, memory usage data, unreferenced object collection data) is received at a garbage collection simulator. In one embodiment, where the garbage collection simulator resides in the JVM, the memory usage data is accessed directly. In another embodiment, the memory usage data is transmitted to the garbage collection simulator as an email attachment. In another embodiment, the memory usage data is transmitted as a file on a floppy disk. It should be appreciated that the memory usage data is generally a small file, and is easy to transfer from computer system to computer system.

At step 220, the garbage collection simulator is accessed. The garbage collection simulator comprises a graphical user interface that provides a user-friendly mechanism for analyzing and adjusting heap parameters, and for viewing the results of a garbage collection simulation. In one embodiment, the garbage collection simulator resides on the same computer system as the JVM. In another embodiment, the garbage collector simulator is accessed over a network connection.

At step 225, a graphical representation of the memory usage data is generated. As described above, the memory usage data is in tabular form, and is amenable to having a plurality of data plots generated therefrom. In one embodiment, a plurality of data plots are generated to illustrate different aspects of the garbage collection.

Figure 3:
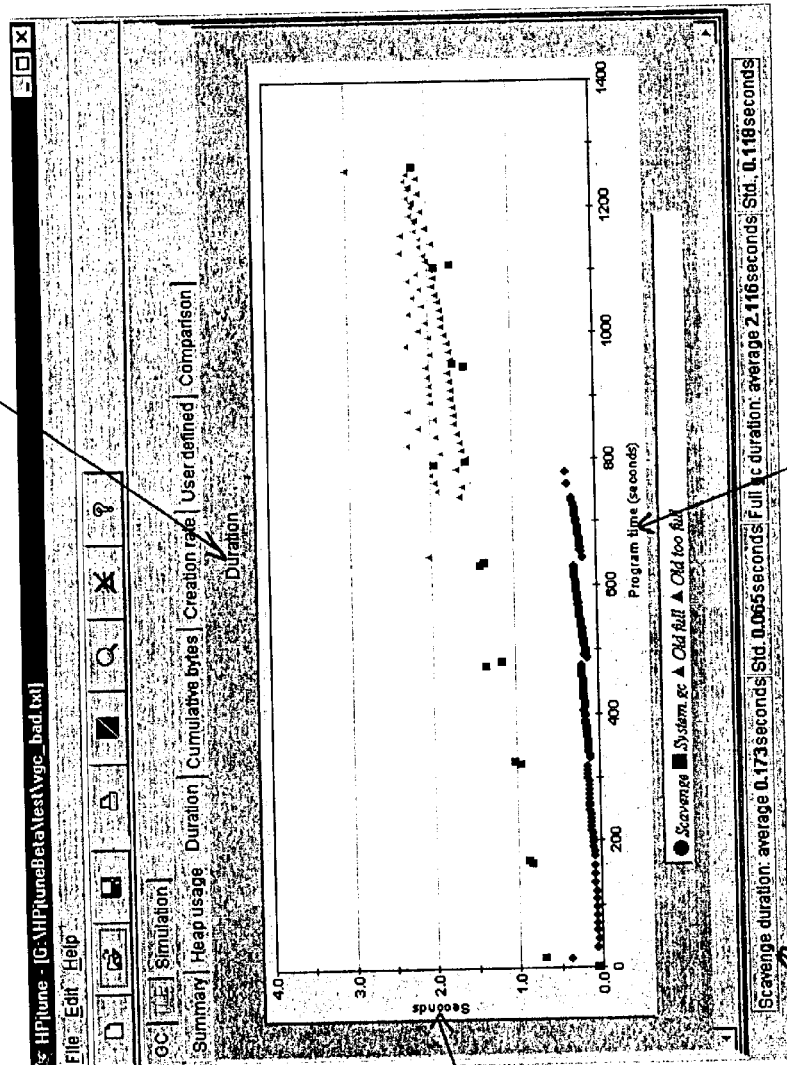
FIG. 3 is an exemplary screen shot of garbage collection duration view generated by a garbage collection simulator graphical user interface in accordance with one embodiment of the present invention.

In particular, the timing information as captured in the memory usage data allows for plotting various information versus the overall time of the application's execution. FIG. 3 is an exemplary screen shot 300 of a garbage collection duration data plot 305 generated by a garbage collection simulator graphical user interface in accordance with one embodiment of the present invention Data plot 305 comprises an x-axis 310 comprising the overall application run time in seconds and a y-axis 315 comprising the run time of a specific garbage collection routine in seconds. Furthermore, data plot 305 illustrates the duration of four types of garbage collection routines: scavenge, system.gc, old full, and old too full. Specifically, data plot 305 illustrates when a garbage collection occurred, what type of garbage collection occurred, and how long it took to run. Overall timing information, such as the average scavenge garbage collection duration and the average full garbage collection duration are shown in timing information 320.

With reference to step 225 of FIG. 2A, a wide variety of data plots or graphical representations can be generated using the memory usage data. In one embodiment, additional data plots include, but are not limited to: heap usage versus time; cumulative bytes freed versus time; and creation rate. Embodiments of the present invention are directed to permitting user-defined graphical representations of data. A user desiring specific garbage collection information may generate a data plot based on requested inputs.

Figure 4:
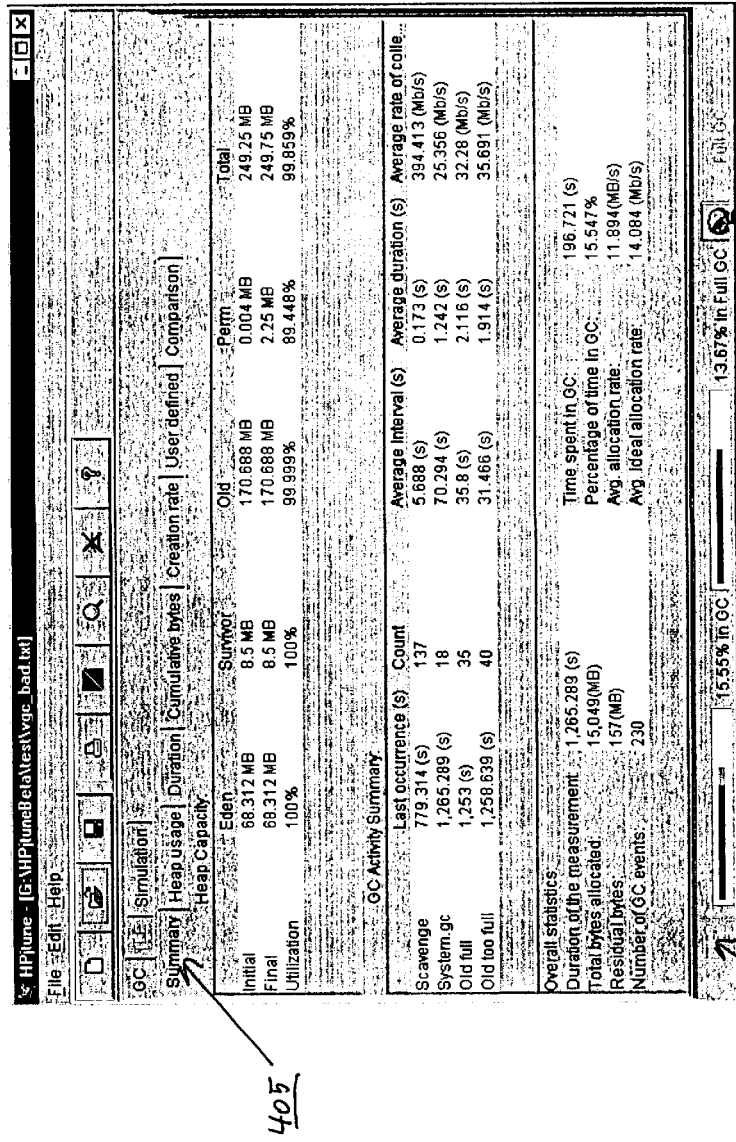
FIG. 4 is an exemplary screen shot of a summary view generated by a garbage collection simulator graphical user interface in accordance with one embodiment of the present invention.

In one embodiment, the memory usage data is presented in a text format illustrating a summary of garbage collection activity during the application run time. FIG. 4 is an exemplary screen shot 400 of summary view 405 generated by a garbage collection simulator graphical user interface in accordance with one embodiment of the present invention. Summary view 405 illustrates detailed information concerning the heap capacity of the JVM, the garbage collection activity, and overall statistics. Timing information 410 comprises information detailing how much time was spent in garbage collection. Pie chart 415 is another graphical representation of the fraction of overall run time spent in garbage collection.

With reference to step 225 of FIG. 2A, a user is presented with a number of graphical representations of garbage collection information. Using these graphical representations, a user can analyze the garbage collection activities of an application. Based on the information presented in the graphical representations, a user may desire to change various input parameters in order to optimize the performance of the application.

At step 230 of FIG. 2B, at least one heap parameter (e.g., a parameter, a memory criterion, or a heap input) is received at the garbage collection simulator. In one embodiment, a user-entered heap parameter is received at the garbage collection simulator. It should be appreciated that a heap parameter can be computer generated, and that the present invention is not intended to be limited to user-generated input for heap parameters.

Figure 5:
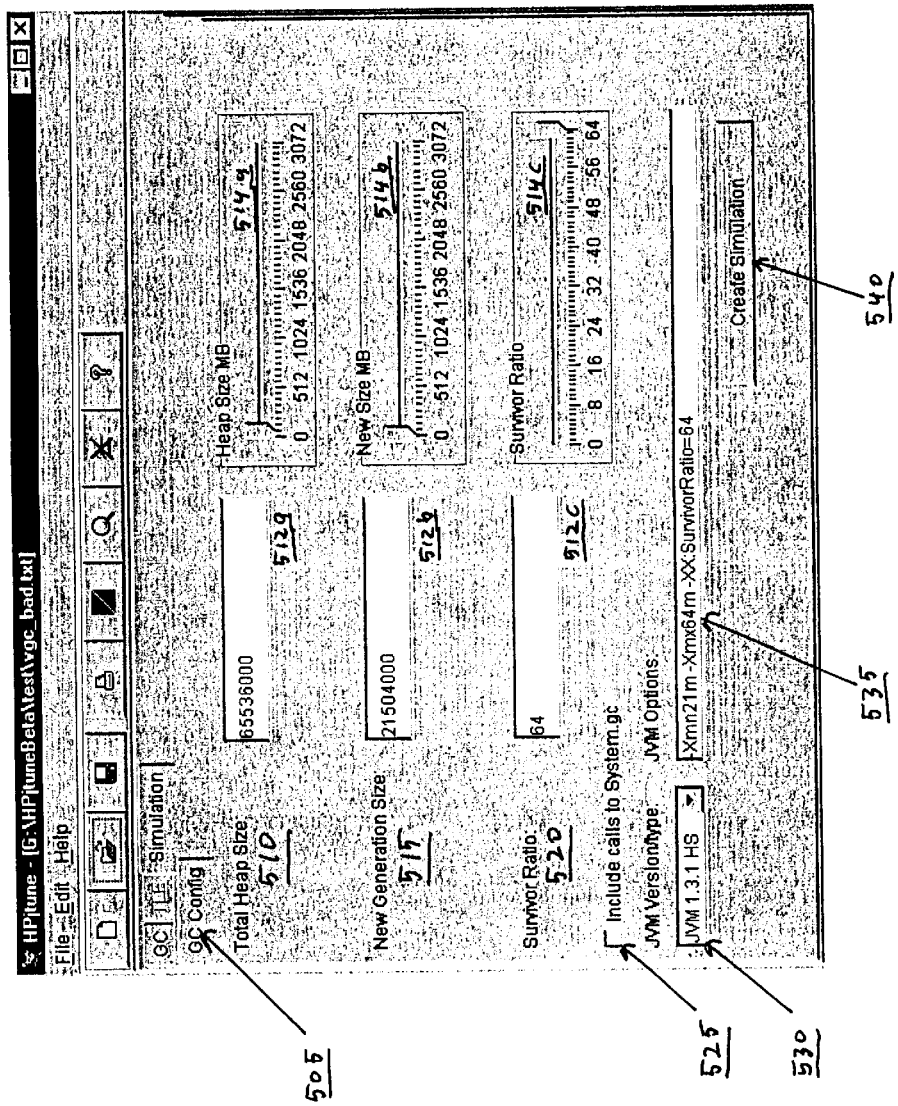
FIG. 5 is an exemplary screen shot of a heap parameter input view generated by a memory usage simulator graphical user interface in accordance with one embodiment of the present invention.

FIG. 5 is an exemplary screen shot 500 of a heap parameter input view 505 generated by a garbage collection simulator graphical user interface in accordance with one embodiment of the present invention. Heap parameter input view allows for a user to configure the garbage collection of an application by altering various heap parameters. In one embodiment, there are four heap parameters: total heap size 510, new generation size 515, survivor ratio 520, and calls to system.gc indicator 525.

In one embodiment, heap parameter input view 505 presents the heap parameters as they exist in the application as run. A user then changes the values of the heap parameters relative to the original value. For example, where the JVM has a total heap size 510 of 64 MB, the heap parameter input view illustrates the value 64 MB associated with total heap size 510. A user may then change the value of total heap size 510, having been made aware of the original value.

In one embodiment, the heap parameter values for total heap size 510, new generation size 515 and survivor ratio 520 can be changed by directly entering text into a text box (e.g., text box 512a–c). In one embodiment, the heap parameter values for total heap size 510, new generation size 515 and survivor ratio 520 can be changed by moving a slider (e.g., slider 514a–c). In one embodiment the value depicted in text box 512 is updated as slider 514 is moved. In another embodiment, the value depicted by slider 514 is updated as a new value is entered into text box 512.

In one embodiment, indicator 525 is a check box indicating whether application initiated requests to perform memory management are included in the application run. If the application has initiated such requests, based on the trace data, this box is initially checked. A user may check or uncheck the box depending on the nature of the application.

In one embodiment, heap parameter input view 505 comprises a JVM selector 530. In one embodiment, the JVM selector 530 is a pull-down menu comprising a plurality of JVM versions. JVM selector initially illustrates which JVM version/type was used in the application run, with the ability to produce JVM options for other JVM versions/types. A user can change the JVM version/type options that are necessary for re-running their application by selecting a different JVM version. Once a user has entered in the desired heap parameters, a simulation is executed by activating simulation activator 540.

In one embodiment, heap parameter input view 505 comprises JVM options 535. JVM options 535 is a text string comprising the values selected for total heap size 510, new generation size 515, survivor ratio 520, and calls to system.gc indicator 525. JVM options 535 can be copied directly in the JVM once the desired heap parameters have been attained.

At step 235 of FIG. 2B, the workload characteristics are modified. It should be appreciated that step 235 is optional, and that the workload characteristics may remain the same. At step 240, the garbage collection simulator configuration is modified. It should be appreciated that step 240 is optional, and that the garbage collection simulator configuration may remain the same.

At step 245 of FIG. 2B, a garbage collection simulation (e.g., memory usage simulation) is executed. In one embodiment, selecting a simulation activator (e.g., simulation activator 340 of FIG. 3) activates the garbage collection simulation. The garbage collection simulation is based on the memory usage data and the input parameters.

Figure 6:
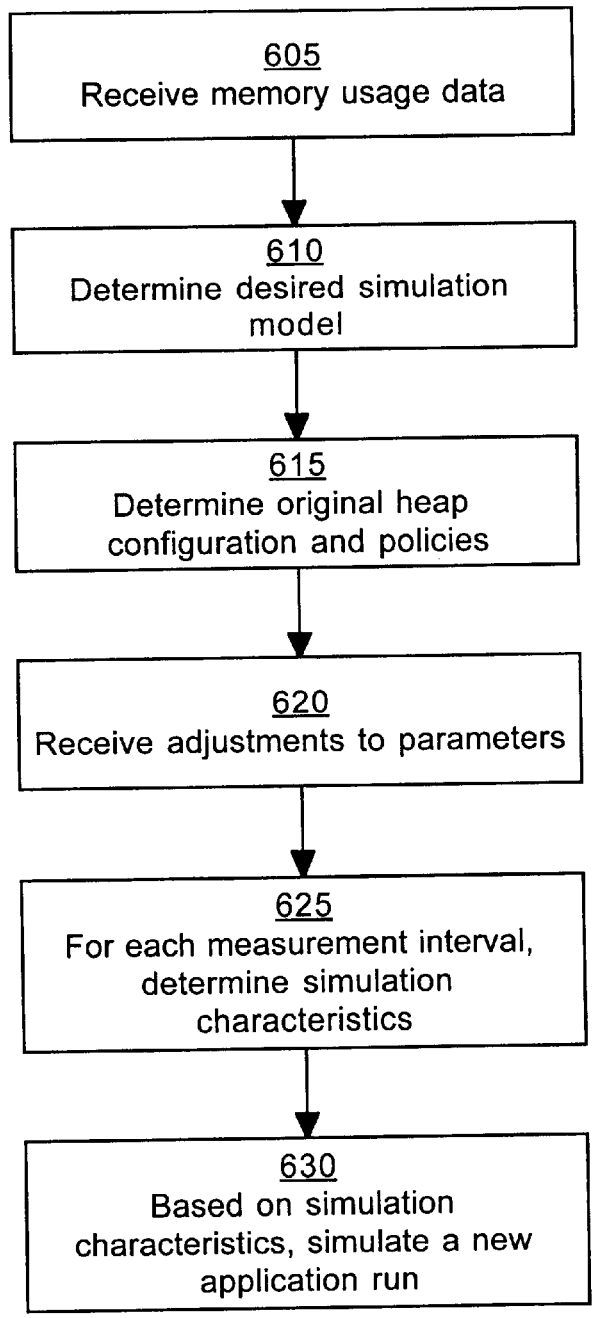
FIG. 6 is a flowchart diagram illustrating a process for simulating a garbage collection in accordance with one embodiment of the present invention.

FIG. 6 is a flowchart diagram illustrating a process 600 for simulating a garbage collection (e.g., memory usage) in accordance with an embodiment of the present invention. At step 605, detailed garbage collection trace data is received. In one embodiment, the garbage collection trace data is acquired through the -Xverbosegc option on HP-UX. In one embodiment, the garbage collection trace data comprises information regarding the collection of garbage, and is also referred to herein as garbage collection data.

At step 610, it is determined what simulation model should be used based on the format of the garbage collection trace data. At step 615, the original heap configuration and policies are determined based on the input garbage collection trace data. At step 620, at least one adjustment to a heap parameter is received. It should be appreciated that the adjustments may be made to the heap configuration, the work load characteristics, or the simulator parameters.

At step 625, simulation characteristics are determined for each measurement interval represented in the trace data. In one embodiment, the simulation characteristics comprise:
  determine total memory allocated;
  determine total memory that is collected;
  estimate the memory allocation rate; and
  estimate the rate at which memory becomes unreferenced.

At step 630, a new application run is simulated based on the simulation characteristics determined at step 625. In one embodiment, the garbage collection simulation data estimated for the modified heap configuration includes, but is not limited to:
  the intervals between garbage collection;
  the duration of each of the individual collections;
  the cause for each garbage collection;
  the total memory allocated between two collections;
  the total memory collected between two collections;

the duration of each individual garbage collection; and an estimation of the distribution of memory usage by age.

At step 250 of FIG. 2B, an analysis and graphical representation of the garbage collection simulation data is generated. In one embodiment, the garbage collection simulation data is in tabular form, and is amenable to having a plurality of data plots generated therefrom. In one embodiment, a plurality of data plots are generated to illustrate different aspects of the garbage collection simulation. In particular, garbage collection simulation data comprises timing information that allows for plotting various information versus the overall time of the application's execution.

It should be appreciated that the graphical representation generated for the garbage collection simulation data is similar to that generated for the garbage collection data at step 225 of FIG. 2A. For example, exemplary screen shot 300 of FIG. 3 is also an illustration of a garbage collection duration data plot 305 based on the garbage collection simulation data. Likewise, exemplary screen shot 400 of FIG. 4 is also an illustration of summary view 405 based on the garbage collection simulation data.

As with the garbage collection data, a wide variety of data plots or graphical representations can be generated using the garbage collection simulation data. In one embodiment, additional data plots include, but are not limited to: heap usage versus time; cumulative bytes freed versus time; and creation rate. Embodiments of the present invention are directed to permitting user-defined graphical representations of data. A user desiring specific garbage collection information may generate a data plot based on requested inputs.

In one embodiment, a graphical representation is generated comparing the garbage collection simulation data with the garbage collection data. In another embodiment, a graphical representation is generated comparing the garbage collection simulation data with another set of garbage collection simulation data. It should be appreciated that any number of garbage collection simulation data sets can be compared. The comparison graphical representation allows a user to analyze the performance of a plurality of different sets of heap parameters for the same application, thus allowing the user to select a desirable set of heap parameters for the application.

A user is presented with a number of graphical representations of garbage collection simulation information. Using these graphical representations, a user can analyze the garbage collection activities of an application. Based on the information presented in the graphical representations, a user may desire to change various input parameters in order to optimize the performance of the application and rerun the simulation.

At step 255, it is determined whether or not to run another simulation. In one embodiment, this determination is made by a user. Provided the user decides to run another simulation, process 200 returns to step 230, where at least one new heap parameter is entered. Alternatively, provided the user does not want to run another simulation, process 200 continues on to step 250.

At step 260 of FIG. 2A, the optimized heap parameters are inserted into the JVM. In one embodiment, the heap parameters are provided by the garbage collection simulator as a character string (e.g., JVM options 535 of FIG. 5). In one embodiment, the character string is inserted directly into the JVM by the garbage collection simulator. In another embodiment, a user can copy and paste the character string from the garbage collection simulator directly into the JVM.

At step 265, it is determined whether or not to continue the analysis of the simulation results is. In one embodiment, this determination is made by a user. Provided the user decides to continue the analysis, process 200 returns to step 210. Alternatively, provided the user decides not to continue the analysis, process 200 continues on to step 270.

At step 270, the application is executed within the JVM with the optimized heap parameters. It should be appreciated that step 270 is optional, and that optimized heap parameters can be relied on. However, because the optimized heap parameters are the result of a simulation, it may be desirable to run the application with the optimized heap parameters to ensure their effectiveness.

Figure 7:
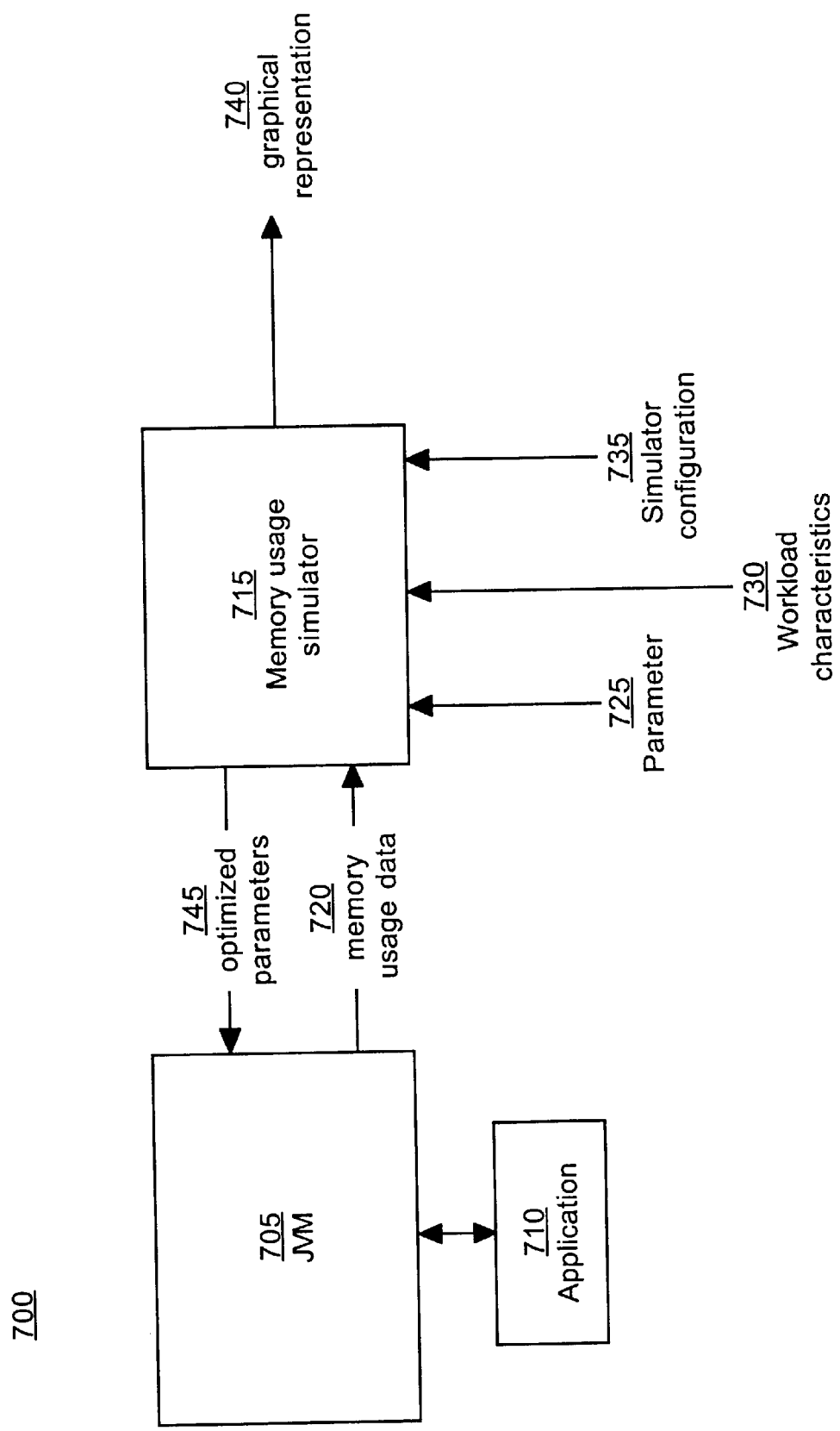
FIG. 7 is a data flow diagram illustrating data flow between a Java Virtual Machine and a garbage collection simulator in accordance with one embodiment of the present invention.

FIG. 7 is a data flow diagram 700 illustrating data flow between a JVM 705 and a memory usage simulator 715 (e.g., a garbage collection simulator) in accordance with one embodiment of the present invention. It should be appreciated that JVM 705 and memory usage simulator 715 may reside on the same computer system or on different computer systems. The data transferred between JVM 705 and memory usage simulator 715 (e.g., memory usage data 720 and optimized parameters 745) is generally small, and is easy to transfer regardless of where JVM 705 and memory usage simulator 715 reside.

Java-based application 710 is executed within JVM 705, wherein a memory usage data 720 is generated. Memory usage data 720 is transmitted to memory usage simulator 715. Memory usage data 720 comprises memory usage information including timing information concerning each garbage collection. Memory usage simulator 715 generates a graphical representation 740 of the memory usage data.

In response to graphical representation 740, at least one parameter 725 is inputted into memory usage simulator 715. Optionally, workload characteristics 730 and simulator configuration 735 are inputted into memory usage simulator 715. Based on memory usage data 720 and input heap parameters 725, a simulation is executed. Specifically, based on memory usage data 720, a number of assumptions are made. For example, a linear rate of allocations between garbage collections is assumed. By assuming the behavior of the garbage collections, a simulation can be performed accounting for changes in the heap parameters. It should be appreciated that other embodiments of the invention could make different assumptions.

Upon completion of the simulation, in one embodiment, graphical representation 740 is updated to display the results of the simulation. It should be appreciated that the simulation can be repeated any number of times for various heap parameters 725. Upon determination that the heap parameters are optimized, the optimized heap parameters 745 are inserted into the JVM.

The preferred embodiment of the present invention, a method for optimization of memory usage for a computer application, is thus described. While the present invention has been described in particular embodiments, it should be appreciated that the present invention should not be construed as limited by such embodiments, but rather construed according to the below claims.

What is claimed is:

1. A method for optimization of memory usage for a computer program, said method comprising:
    a) receiving application memory usage data, said application memory usage data comprising timing information;
    b) generating a graphical representation of said application memory usage data;
    c) receiving at least one heap parameter; and
    d) performing a memory usage simulation based on said memory usage data and said heap parameter.

2. A method as recited in claim 1 wherein said computer program is Java-based.

3. A method as recited in claim 1 further comprising inserting said heap parameter into a programming language interpreter.

4. A method as recited in claim 3 wherein said programming language interpreter is a Java Virtual Machine.

5. A method as recited in claim 1 wherein said heap parameter is received in response to a user input.

6. A method as recited in claim 1 further comprising repeating said c) and said d) to optimize said garbage collection.

7. A method as recited in claim 1 further comprising generating a graphical representation of said garbage collection simulation.

8. A method as recited in claim 1 wherein said memory usage data is received from a memory allocation behavior trace.

9. A method as recited in claim 8 wherein said memory allocation behavior trace is recorded as -Xverbosegc data.

10. A method as recited in claim 1 wherein said d) comprises:

receiving said memory usage data;

determining a simulation model based on said memory usage data;

determining heap configuration and heap policies based on said memory usage data;

receiving at least one said heap parameter;

determining simulation characteristics for at least one measurement interval of said memory usage data; and simulating an application run based on said simulation characteristics.

11. A computer-readable medium having computer-readable program code embodied therein for causing a computer system to perform a method for simulating collection of unreferenced objects, said method comprising:

a) accessing unreferenced object collection data comprising timing data;

b) illustrating a viewable depiction of said unreferenced object collection data;

c) accessing at least one memory criterion;

d) executing an unreferenced object collection simulation based on said unreferenced object collection data and said memory criterion; and e) illustrating a viewable depiction of said garbage collection simulation.

12. A computer-readable medium as recited in claim 11 further comprising inserting said memory criterion into a programming language interpreter.

13. A computer-readable medium as recited in claim 12 wherein said programming language interpreter is a Java Virtual Machine.

14. A computer-readable medium as recited in claim 11 wherein said memory criterion is user-defined.

15. A computer-readable medium as recited in claim 11 further comprising repeating said c) through said e) to optimize said collection of unreferenced objects.

16. A computer system comprising:

a bus;

a computer-readable memory coupled to said bus; and a processor coupled to said bus, said processor for performing a method of garbage collection simulation, said method comprising:

a) receiving garbage collection data comprising timing data;

b) rendering a visual portrayal of said garbage collection data;

c) receiving at least one heap input;

d) executing a garbage collection simulation based on said garbage collection data and said heap input; and e) rendering a visual portrayal of said garbage collection simulation.

17. A computer system as recited in claim 16 further comprising inputting said heap input into a programming language interpreter.

18. A computer system as recited in claim 17 wherein said programming language interpreter is a Java Virtual Machine.

19. A computer system as recited in claim 16 wherein said heap input is user-defined.

20. A computer system as recited in claim 16 further comprising repeating said c) through said e) to optimize said garbage collection.

21. A method of simulating memory usage comprising:

a) receiving memory usage data;

b) determining a simulation model based on said memory usage data;

c) determining heap configuration and heap policies based on said memory usage data;

d) receiving at least one heap parameter;

e) determining simulation characteristics for at least one measurement interval of said memory usage data; and f) simulating an application run based on said simulation characteristics.

22. A method as recited in claim 21 wherein said e) comprises:

determining total memory allocated;

determining total memory collected;

estimating memory allocation rate; and estimating rate at which memory becomes unreferenced.

23. A method as recited in claim 21 wherein said f) comprises generating memory usage simulation data comprising:

intervals between adjacent garbage collections;

duration of at least one said garbage collections;

cause for at least one said garbage collection;

total memory allocated between adjacent said garbage collections;

total memory collected between adjacent said garbage collections; and estimation of distribution of memory usage by age.

* * * * *